United States Patent
Tian et al.

(10) Patent No.: US 10,278,038 B2
(45) Date of Patent: Apr. 30, 2019

(54) METHOD AND APPARATUS FOR SEARCHING FOR SHORT-DISTANCE OBJECT

(71) Applicant: Tencent Technology (Shenzhen) Company Limited, Shenzhen (CN)

(72) Inventors: Yuan Tian, Shenzhen (CN); Lin Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/703,603

(22) Filed: Sep. 13, 2017

(65) Prior Publication Data

US 2018/0007524 A1    Jan. 4, 2018

Related U.S. Application Data

(63) Continuation-in-part of application No. PCT/CN2016/101480, filed on Oct. 8, 2016.

(30) Foreign Application Priority Data

Oct. 19, 2015 (CN) .......................... 2015 1 0677758

(51) Int. Cl.
*H04W 4/21* (2018.01)
*H04W 4/80* (2018.01)
(Continued)

(52) U.S. Cl.
CPC .............. *H04W 4/21* (2018.02); *G06Q 50/00* (2013.01); *G06Q 50/01* (2013.01); *H04L 67/16* (2013.01);
(Continued)

(58) Field of Classification Search
CPC ......... H04W 4/21; H04W 4/02; H04W 4/206; H04W 8/005; H04W 88/02; H04L 67/306
(Continued)

(56) References Cited

U.S. PATENT DOCUMENTS

2007/0281689 A1* 12/2007 Altman .............. G06Q 30/0207
455/435.1
2008/0079539 A1*  4/2008 Daley ..................... H04W 4/02
340/7.29
(Continued)

FOREIGN PATENT DOCUMENTS

CN          102571910 A       7/2012
CN          103514799 A       1/2014
(Continued)

OTHER PUBLICATIONS

Tencent Technology, ISRWO, PCT/2016/101480, dated Jan. 17, 2017, 10 pgs.
Tencent Technology, IPRP, PCT/2016/101480, Apr. 24, 2018, 9 pgs.

*Primary Examiner* — William Nealon
(74) *Attorney, Agent, or Firm* — Morgan, Lewis & Bockius LLP

(57) ABSTRACT

The present disclosure discloses a method and a computer server for searching for a short-distance object and pertains to the field of mobile terminal technologies. The method includes: receiving a short-distance object search request sent by a target terminal; obtaining location information of the target terminal from the short-distance object search request; separately determining, according to the location information of the target terminal, location information of prestored objects for short-distance object search, and multiple preset distance ranges, objects whose distances from the target terminal fall within each distance range, to obtain one or more objects corresponding to each distance range; separately randomly selecting at least one to-be-presented (Continued)

object from the one or more objects corresponding to each distance range; and returning the to-be-presented objects to be presented on the target terminal. By means of the present disclosure, effectiveness of a short-distance object search function can be enhanced.

18 Claims, 7 Drawing Sheets

(51) Int. Cl.
    *H04W 4/02* (2018.01)
    *H04W 8/00* (2009.01)
    *G06Q 50/00* (2012.01)
    *H04L 29/08* (2006.01)
    *H04W 88/02* (2009.01)
(52) U.S. Cl.
    CPC ............... *H04L 67/18* (2013.01); *H04W 4/02* (2013.01); *H04W 4/80* (2018.02); *H04W 8/005* (2013.01); *H04L 67/306* (2013.01); *H04W 88/02* (2013.01)
(58) Field of Classification Search
    USPC ....................................................... 455/456.1
    See application file for complete search history.

(56) References Cited

U.S. PATENT DOCUMENTS

| | | | |
|---|---|---|---|
| 2010/0178939 | A1 | 7/2010 | Kang et al. |
| 2010/0205242 | A1* | 8/2010 | Marchioro, II ........ G06Q 10/10 709/203 |
| 2012/0276929 | A1 | 11/2012 | Park et al. |
| 2012/0281686 | A1 | 11/2012 | Pollari |
| 2013/0012237 | A1* | 1/2013 | Hamynen ........... G06F 17/3087 455/456.3 |
| 2013/0036165 | A1 | 2/2013 | Tseng et al. |
| 2014/0269657 | A1* | 9/2014 | Kim ...................... H04W 8/005 370/338 |
| 2015/0095793 | A1 | 4/2015 | Cai et al. |

FOREIGN PATENT DOCUMENTS

| | | |
|---|---|---|
| CN | 105120426 A | 12/2015 |
| CN | 105159906 A | 12/2015 |
| CN | 105392117 A | 3/2016 |
| JP | 2013225338 A | 10/2013 |
| JP | 2014209395 A | 11/2014 |

\* cited by examiner

METHOD AND APPARATUS FOR SEARCHING FOR SHORT-DISTANCE OBJECT

RELATED APPLICATION

This application is a continuation-in-part application of PCT/CN2016/101480, entitled "METHOD AND APPARATUS FOR SEARCHING FOR SHORT-DISTANCE OBJECT" filed on Oct. 8, 2016, which claims priority to Chinese Patent Application No. 201510677758.3, filed with the State Intellectual Property Office of the People's Republic of China on Oct. 19, 2015, and entitled "METHOD AND APPARATUS FOR SEARCHING FOR SHORT-DISTANCE OBJECT", both of which are incorporated herein by reference in their entirety.

FIELD OF THE TECHNOLOGY

The present disclosure relates to the field of mobile terminal technologies, and in particular, to a method and an apparatus for searching for a short-distance object.

BACKGROUND OF THE DISCLOSURE

With the development of mobile terminal technologies, terminals such as mobile phones and tablet computers are widely applied. There are more types of applications on a terminal and the applications have richer functions. For example, a short-distance object search function is added to a social networking application. A user may search for objects nearby by using the function, such as accounts nearby, groups nearby, or activities nearby.

Using an example in which an object is a user account of a social networking application, when a user searches for accounts nearby by using the short-distance object search function, a terminal (which may be referred to as a target terminal) of the user displays options of a particular quantity of accounts, for the user to view. The displayed options of accounts are arranged in an ascending order of distances between terminals to which the corresponding accounts log in and the target terminal. The user may select an account in which the user is interested from the accounts and communicate with the selected account.

In the process of implementing the present disclosure, the inventor finds that the relevant technology has at least the following problem:

Based on the foregoing processing, if the user searches for objects nearby for multiple times in a particular place (such as a housing), most of objects displayed by the terminal each time may be the same. Objects in which the user is not interested in previous short-distance object search results are quite likely to be displayed in a current short-distance object search result. Consequently, effectiveness of the short-distance object search function is poor.

SUMMARY

To resolve the problem of the relevant technology, embodiments of the present disclosure provide a method and an apparatus for searching for a short-distance object. The technical solutions are as follows:

According to a first aspect, a method for searching for a short-distance object is provided, including:

receiving a short-distance object search request sent by a target terminal, and obtaining location information of the target terminal from the short-distance object search request;

separately determining, according to the location information of the target terminal, location information of prestored objects for short-distance object search, and multiple preset distance ranges, objects whose distances from the target terminal fall within each distance range, to obtain one or more objects corresponding to each distance range; and separately randomly selecting at least one to-be-presented object from the one or more objects corresponding to each distance range, and returning the to-be-presented objects to be presented on the target terminal.

According to a second aspect, an apparatus for searching for a short-distance object is provided, including:

a receiving module, configured to: receive a short-distance object search request that is sent by a target terminal and that carries location information of the target terminal;

a determining module, configured to separately determine, according to the location information of the target terminal, location information of prestored objects for short-distance object search, and multiple preset distance ranges, objects whose distances from the target terminal fall within each distance range, to obtain one or more objects corresponding to each distance range; and a presentation module, configured to: separately randomly select a to-be-presented object from the objects corresponding to each distance range, and return the to-be-presented objects to be presented on the target terminal.

According to a third aspect, a server is provided, the server including:

one or more processors; and a memory, the memory storing one or more programs, the one or more programs being configured to be executed by the one or more processors, and the one or more programs including instructions for performing the following operations:

receiving a short-distance object search request sent by a target terminal, and obtaining location information of the target terminal from the short-distance object search request;

separately determining, according to the location information of the target terminal, location information of prestored objects for short-distance object search, and multiple preset distance ranges, objects whose distances from the target terminal fall within each distance range, to obtain one or more objects corresponding to each distance range; and separately randomly selecting at least one to-be-presented object from the one or more objects corresponding to each distance range, and returning the to-be-presented objects to be presented on the target terminal.

The technical solutions provided in the embodiments of the present disclosure have the following beneficial effects:

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

Figure 1:
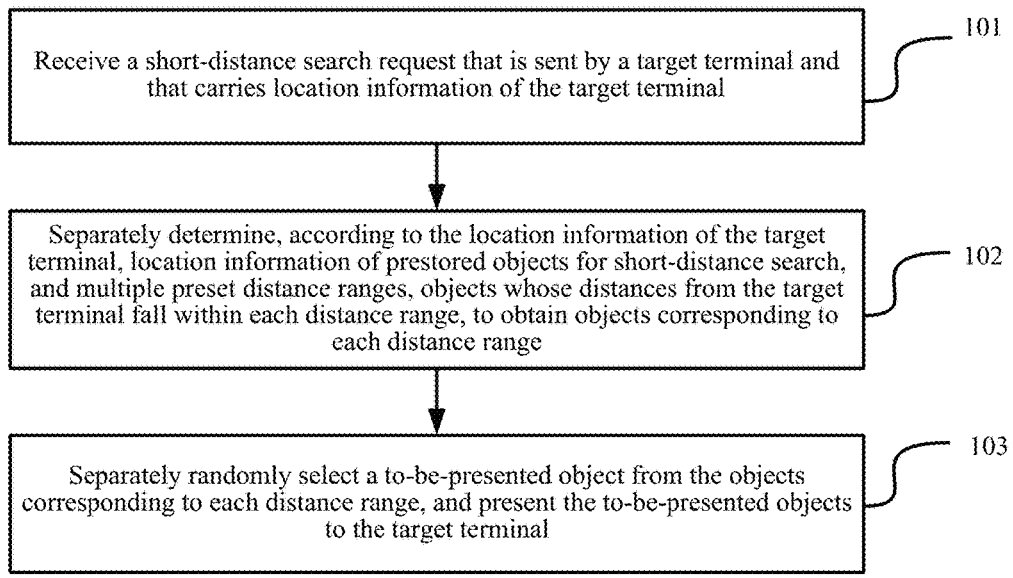
FIG. 1 is a flowchart of a method for searching for a short-distance object according to some embodiments of the present disclosure.

This embodiment of the present disclosure provides a method for searching for a short-distance object. As shown in FIG. 1, a processing process of the method may include the following operations:

Operation 101: Receive a short-distance object search request sent by a target terminal, and obtain location information of the target terminal from the short-distance object search request.

Operation 102: Separately determine, according to the location information of the target terminal, location information of prestored objects for short-distance object search, and multiple preset distance ranges, objects whose distances from the target terminal fall within each distance range, to obtain one or more objects corresponding to each distance range.

Operation 103: Separately randomly select a to-be-presented object from the objects corresponding to each distance range, and return the to-be-presented objects to be presented on the target terminal.

In this embodiment of the present disclosure, a short-distance object search request sent by a target terminal is received, and location information of the target terminal is obtained; objects whose distances from the target terminal fall within each distance range are separately determined according to the location information of the target terminal, location information of prestored objects for short-distance object search, and multiple preset distance ranges, to obtain one or more objects corresponding to each distance range; and a to-be-presented object is separately randomly selected from the objects corresponding to each distance range, and the to-be-presented objects are presented to the target terminal. In this way, there is relatively great randomness when a server presents short-distance objects, lowering duplication of objects that are found for multiple times, and thereby enhancing effectiveness of a short-distance object search function.

This embodiment of the present disclosure provides a method for searching for a short-distance object. The method is executed by a server. The server may be a server configured to search for a short-distance object, or may be a backend server for an application having a short-distance object search function. For example, the short-distance object search function may be a "people nearby" function in a social networking application, a corresponding object is a user account of a social networking application, and the server may be a backend server for the social networking application. A processor, a memory, and a transceiver may be provided in the server. The processor may be configured for a processing process related to searching for a short-distance object. The memory may be configured to store data that is required and generated in the following processing process. The transceiver may be configured to receive and send data.

The processing process shown in FIG. 1 is described in detail below with reference to specific implementations. Content may be as follows:

Operation 101: Receive a short-distance object search request sent by a target terminal, and obtain location information of the target terminal from the short-distance object search request.

Figure 2:
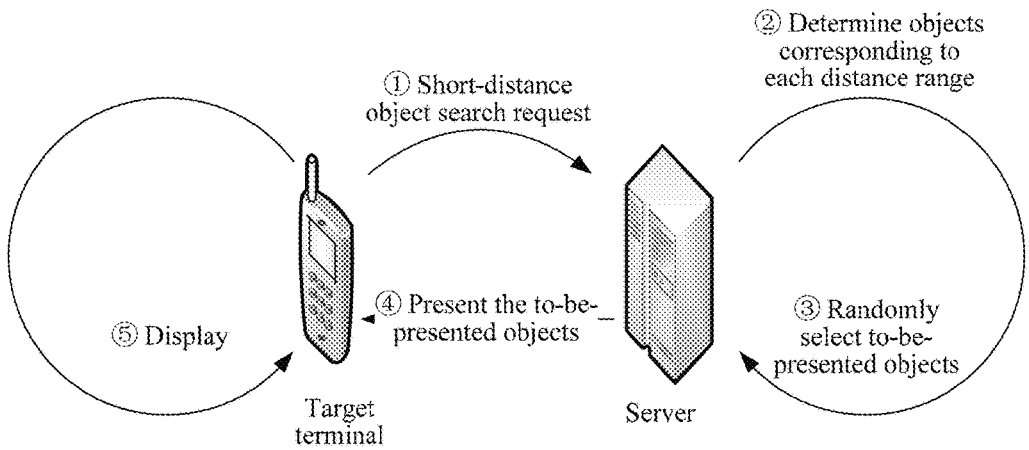
FIG. 2 is a schematic diagram of a scenario according to some embodiments of the present disclosure.

During implementation, when a user intends to chat with people nearby, participate in activities nearby, or join chat groups nearby, the user may search for people nearby, activities nearby, or groups nearby by using a short-distance object search function in an application. For example, the user may search for a user corresponding to a terminal close to a terminal (which may be referred to as a target terminal) of the user by using a "people nearby" function in a social networking application, and communicate with the user. A button (which may be referred to as a short-distance object search button) corresponding to the short-distance object search function may be set in the social networking application. When using the short-distance object search function in the application, the user may tap on the short-distance object search button in the application. This triggers the terminal to generate a short-distance object search request. In some embodiments, the terminal has a built-in capability of determining its current location using its GPS module or its connection to nearby cellular base station or its IP address. The terminal may obtain a prestored address of the server and current location information, and then send a short-distance object search request to the server. The short-distance object search request may carry the location information of the target terminal. As shown in FIG. 2, the server may receive the short-distance object search request sent by the target terminal, and parse the short-distance object search request, to obtain the location information of the target terminal carried in the short-distance object search request. In addition, a location query server may further be provided in the solution. The location query server may be a server dedicatedly configured to record the location information of the terminal. In this way, when the user taps on the short-distance object search button in the application, the terminal may send the short-distance object search request to the server according to the prestored address of the server. After receiving the short-distance object search request sent by the target terminal, the server may obtain the location information of the target terminal from the location query server.

Operation 102: Separately determine, according to the location information of the target terminal, location information of prestored objects for short-distance object search, and multiple preset distance ranges, objects whose distances from the target terminal fall within each distance range, to obtain one or more objects corresponding to each distance range.

The objects may be accounts, activities, and chat groups. For the "people nearby" function, the objects for short-distance object search may be accounts that log in to terminals that have sent short-distance object search requests to the server. The location information of the objects for short-distance object search may be location information of the terminals that have sent the short-distance object search requests to the server. For the "activities nearby" and "groups nearby" functions, the objects for short-distance object search may be activities or group names of chat groups that are sent to the server by terminals to which accounts creating the activities or the chat groups log in. The location information of the objects for short-distance object search may be location information of the creating terminals when creating the chat groups, or organization location information of the activities that is set by the users by using the terminals.

Figure 3:
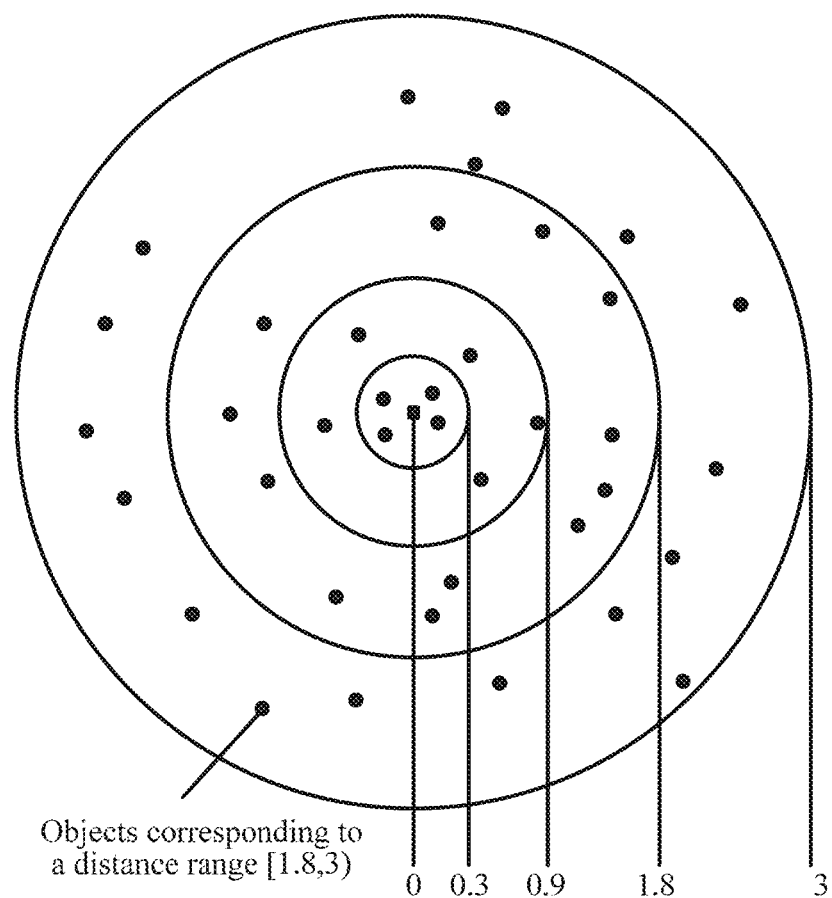
FIG. 3 is a schematic diagram of obtaining objects corresponding to each distance range according to some embodiments of the present disclosure.

During implementation, as shown in FIG. 3, after obtaining the location information of the target terminal carried in the short-distance object search request, the server may obtain the location information of the prestored objects for short-distance object search and the multiple preset distance ranges. The multiple preset distance ranges may be ranges of distances between the objects and the target terminal. A distance segment from zero to a preset value may be divided into multiple continuous distance ranges (which may be divided at equal distances or may be randomly divided). For example, the preset value may be 3 km, and the multiple distance ranges may be as follows: [0, 0.3) km, [0.3, 0.9) km, [0.9, 1.8) km, and [1.8, 3) km. The server may calculate, according to the obtained location information of the target terminal and the location information of the objects for short-distance object search, distances between all the prestored objects for short-distance object search and the target terminal, and determine a distance range within which each calculated distance falls, so as to obtain the objects corresponding to each distance range.

Optionally, when the objects are activities, the server may screen activities corresponding to each distance range according to differences between activity organization times and a current time. Correspondingly, a processing process of operation 102 may be as follows: the objects for short-distance object search are activities; activities whose distances from the target terminal fall within each distance range are separately determined, according to the location information, location information of prestored activities for short-distance object search, and the multiple preset distance ranges, in activities for which differences between activity organization times and the current time are less than a preset time length threshold, to obtain activities corresponding to each distance range.

During implementation, the server may prestore the time length threshold for screening activities. When the objects for short-distance object search are activities, after determining the activities corresponding to each distance range according to the location information of the target terminal carried in the obtained short-distance object search request, the location information of the prestored objects for short-distance object search, and the multiple preset distance ranges, the server may further obtain activity organization times corresponding to all the prestored activities, and then subtract each activity organization time from the current time, to obtain a time difference corresponding to each activity. Then, the obtained time differences are compared with the preset time length threshold, so that activities for which differences between activity organization times and the current time are less than the preset time length threshold are selected from the determined activities corresponding to each distance range, and the activities are used as the activities corresponding to each distance range. In this way, organization times of activities corresponding to each distance range are all relatively close to the current time. This is convenient for the user to determine, according to a time condition of the user, whether to sign up for the activity (the sign-up activity can be regarded as a type of communication).

Optionally, when the objects are user accounts of a social networking application, the server may screen activities corresponding to each distance range according to differences between times when short-distance object search requests are sent at the last time and the current time. Correspondingly, a processing process of operation 102 may be as follows: the objects for short-distance object search are user accounts of a social networking application; accounts that logs in to terminals whose distances from the target terminal fall within each distance range are separately determined, according to the location information, location information of terminals to which prestored user accounts for short-distance object search log in, and the multiple preset distance ranges, in user accounts that currently log in and for which differences between times when the user accounts send short-distance object search requests for the last time and the current time are less than a preset time length threshold, to obtain one or more user accounts corresponding to each distance range.

During implementation, the server may prestore a time length threshold for screening accounts. When the objects for short-distance object search are user accounts of a social networking application, after terminals to which the accounts log in send short-distance object search requests, the server may keep location information of the terminals for a period of time. After receiving location information removal messages sent by the terminals, the server may delete the locally stored location information of the terminals, or the server may automatically delete the location information of the terminal after storage duration of the location information reaches particular preset duration.

After obtaining the location information of the target terminal carried in the short-distance object search request, the server may further obtain location information of terminals to which accounts for short-distance object search log in that are still currently stored, then calculate distances between the prestored terminals and the target terminal, and determine a distance range within which each calculated distance falls, so as to obtain one or more user accounts corresponding to each distance range. After determining the accounts corresponding to each distance range according to the location information, the server may further obtain accounts that are logging in and times when the user accounts send short-distance object search requests at the last time, and then subtract the obtained times when the short-distance object search requests are sent at the last time from the current time, to obtain a time difference corresponding to each account. The server may compare the obtained time differences with the preset time length threshold, and may select, from the accounts corresponding to each distance range that are determined according to the location information, accounts for which differences between times when the user accounts send short-distance object search requests and the current time are less than the preset time length threshold, and use the accounts as the accounts corresponding to each distance range. In this way, the accounts corresponding to each distance range are all accounts that have recently sent short-distance object search requests and that are currently in a login state, thereby improving a success rate of communication between the user and another person.

Operation 103: Separately randomly select a to-be-presented object from the objects corresponding to each distance range, and return the to-be-presented objects to be presented on the target terminal.

The to-be-presented objects may be objects that are selected by the server for presentation to the target terminal.

Figure 4:
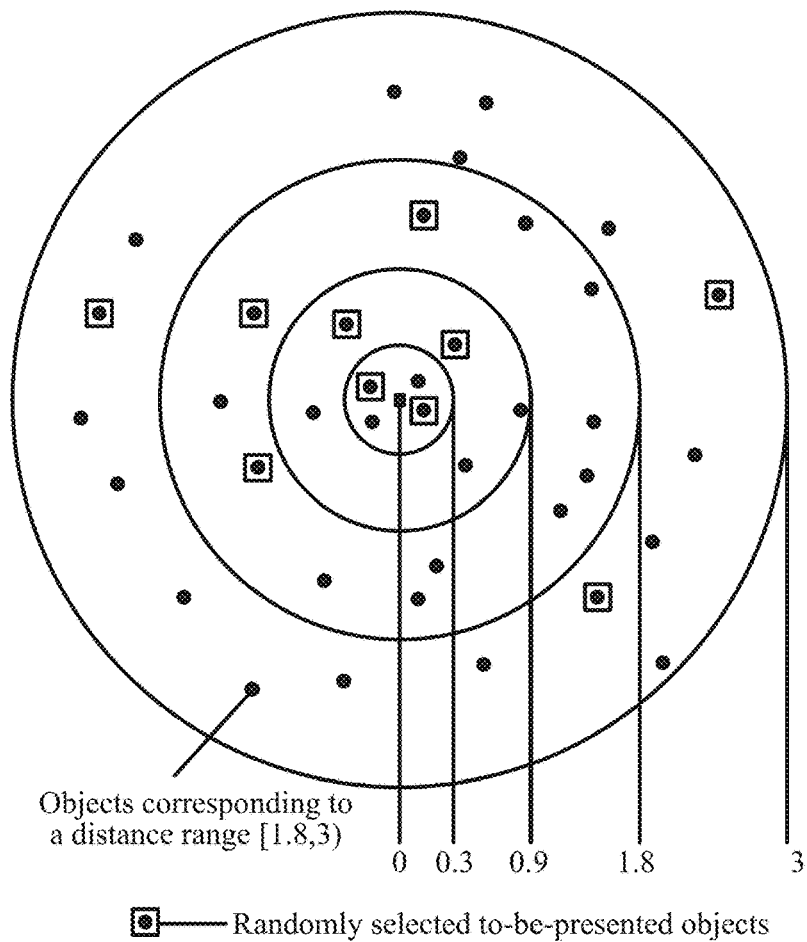
FIG. 4 is a schematic diagram of randomly selecting a to-be-presented object corresponding to each distance range according to some embodiments of the present disclosure.

During implementation, as shown in FIG. 4, after obtaining the objects corresponding to each distance range, the server may separately randomly select a particular quantity of to-be-presented objects from the objects corresponding to each distance range, and send the selected to-be-presented objects to the target terminal. Specifically, if the to-be-presented objects are user accounts of a social networking application, the server may send account information such as accounts, nicknames, and signatures of to-be-presented accounts to the target terminal for presentation. If the to-be-presented objects are activities, the server may send activity information such as themes, times, places of the activities to the target terminal for presentation. If the to-be-presented objects are chat groups, the server may send group information such as group names, quantities of people, and group owners of the chat groups to the target terminal for presentation.

Optionally, the quantity of to-be-presented objects selected in each distance range may be determined according to a weight corresponding to each distance range. Correspondingly, a processing process may be as follows: obtaining a weight corresponding to each distance range; determining a quantity of to-be-presented objects corresponding to each distance range according to the weight corresponding to the distance range and a preset total quantity of presented objects; and separately randomly selecting the at least one to-be-presented object from the objects corresponding to each distance range according to the quantity of to-be-presented objects corresponding to the distance range.

During implementation, the server may prestore a total quantity of to-be-presented objects to be selected (that is, the preset total quantity of presented objects), after determining the objects corresponding to each distance range, may obtain the weight corresponding to the distance range, and then may separately multiply the weight corresponding to the distance range by the preset total quantity of presented objects, so as to determine the quantity of to-be-presented objects corresponding to each distance range. For each distance range, the server may separately randomly select a to-be-presented object of a quantity of to-be-presented objects corresponding to the distance range from objects corresponding to the distance range.

Optionally, the obtained weight corresponding to each distance range may be a weight that is preset in the server.

Optionally, the weight corresponding to the distance range may be set according to a ratio of a quantity of objects that are selected by accounts in an account library within each distance range to a quantity of objects that are found within the distance range. Correspondingly, a processing process may be as follows: for each distance range, obtaining a quantity of objects that are found by the accounts in the account library by using short-distance object search requests within the distance range within a preset historical time length and a quantity of selected objects among the objects that are found by using the short-distance object search requests within the distance range; for each distance range, determining a ratio of the quantity of objects that are selected within the distance range to the quantity of objects that are found within the distance range; and determining the weight corresponding to the distance range according to the ratio corresponding to each distance range.

During implementation, for each distance range, the server may obtain the quantity of objects that are found when the accounts in the account library send the short-distance object search requests within the preset historical time length, and the quantity of objects that are selected from the objects that are found by the accounts within the distance range. The quantity of found objects is a quantity of to-be-presented objects that are selected by the server when short-distance object search requests are sent in the past time. The quantity of selected objects is a quantity of objects in the found objects with which communication is performed. When the short-distance object search function corresponds to searching for people nearby, the quantity of selected objects is a quantity of accounts in found accounts that communicate with the account of the user. When the short-distance object search function corresponds to searching for activities nearby or chat groups nearby, the quantity of selected objects is a quantity of activities in found activities in which the user signs up to participate or a quantity of chat groups in found chat groups that the user requests joining. After obtaining the foregoing two quantities, for each distance range, the server may divide the quantity of selected objects within each distance range by the quantity of found objects, so as to obtain the ratio corresponding to each distance range. A higher ratio indicates that the user is more likely to communicate with a user within the distance range. The server may divide the ratio corresponding to each distance range by a sum of the ratios corresponding to all the distance ranges, to obtain the weight corresponding to the distance range. It is not difficult to understand that a greater ratio corresponding to a distance range indicates a greater weight corresponding to the distance range and a greater quantity of to-be-presented objects that are randomly selected within the distance range. In this way, duplication of to-be-presented objects can be lowered when the user sends short-distance object search requests for multiple times, and a success rate of communication between the user and randomly selected to-be-presented objects can also be improved.

Optionally, the weight corresponding to the distance range may also be set according to a ratio of a quantity of objects that are selected by a target account that logs in to the target terminal within each distance range to a quantity of objects that are found within the distance range. Correspondingly, a processing process may be as follows: for each distance range, obtaining a quantity of objects that are found by the target account that logs in to the target terminal by using a short-distance object search request within the distance range within a preset historical time length, and a quantity of selected objects among the objects that are found by using the short-distance object search request within the distance range; for each distance range, determining a ratio of the quantity of objects that are selected within the distance range to the quantity of objects that are found within the distance range; and determining the weight corresponding to the distance range according to the ratio corresponding to each distance range.

During implementation, for each distance range, the server may obtain the quantity of objects that are found when the target account sends the short-distance object search request within the preset historical time length, and the quantity of objects that are selected from objects that are found by the target account within the distance range. The quantity of found objects is a quantity of to-be-presented objects that are selected by the server when a short-distance object search request is sent in the past time. The quantity of selected objects is a quantity of objects in the found objects with which communication is performed. When the short-distance object search function corresponds to searching for people nearby, the quantity of selected objects is a quantity of accounts in found accounts that communicate with the account of the user. When the short-distance object search function corresponds to searching for activities nearby or chat groups nearby, the quantity of selected objects is a quantity of activities in found activities in which the user signs up to participate or a quantity of chat groups in found chat groups that the user requests joining. After the foregoing two quantities are obtained, for each distance range, the server may divide the quantity of selected objects within each distance range by the quantity of found objects, so as to obtain the ratio corresponding to each distance range. A higher ratio indicates that the target user is more likely to communicate with a user within the distance range. The server may divide the ratio corresponding to each distance range by a sum of the ratios corresponding to all the distance ranges, to obtain the weight corresponding to the distance range. It is not difficult to understand that a greater ratio corresponding to a distance range indicates a greater weight corresponding to the distance range and a greater quantity of to-be-presented objects that are randomly selected within the distance range. In this way, duplication of to-be-presented objects can be lowered when the user sends short-distance object search requests for multiple times, and a success rate of communication between the user and randomly selected to-be-presented objects can also be improved.

Optionally, a same quantity of to-be-presented objects may be selected within each distance range. Correspondingly, a processing process may be as follows: separately randomly selecting a same quantity of to-be-presented objects from the objects corresponding to each distance range based on a preset total quantity of presented objects.

During implementation, the server may prestore a total quantity of to-be-presented objects to be selected (that is, the preset total quantity of presented objects), and may divide the preset total quantity of presented objects by a quantity of the preset distance ranges, to obtain a quantity corresponding to each distance range. The server may randomly select the same quantity of to-be-presented objects from the found objects corresponding to each distance range.

Optionally, the server may return the to-be-presented objects to be presented on the target terminal in an ascending order of current distances between terminals of the selected to-be-presented objects and the target terminal. Correspondingly, a processing process may be as follows: returning the to-be-presented objects to be presented on the target terminal in an ascending order of current distances between terminals of the selected to-be-presented objects and the target terminal.

During implementation, after randomly selecting the to-be-presented object within each distance range, the server may arrange, in an ascending order of the current distances between terminals of the selected to-be-presented objects and the target terminal, the objects that are selected within each distance range. The server may return the to-be-presented objects to be presented on the target terminal in an ascending order of distances corresponding to the preset multiple distance ranges, and may send a feedback message to the target terminal. The feedback message carries identifiers of the selected to-be-presented objects. The terminal may receive the feedback message sent by the server, parse the feedback message, obtain the identifiers of the to-be-presented objects carried in the feedback message, and display the identifiers of the to-be-presented objects.

In addition, when the server determines the quantity of to-be-presented objects corresponding to each distance range and randomly selects the to-be-presented object within each distance range, if a quantity of objects corresponding to a distance range is less than the quantity of to-be-presented objects, the server may select all the objects corresponding to the distance range. After the corresponding to-be-presented object is selected within each distance range, a total quantity of the selected to-be-presented objects may be subtracted from the preset total quantity of presented objects, to obtain a quantity of to-be-presented objects that further need to be selected. The server may randomly select, from objects corresponding to all the distance ranges other than the randomly selected to-be-presented objects, to-be-presented objects of the quantity of to-be-presented objects that further need to be selected. In addition, the server may also obtain objects corresponding to a distance from the target terminal beyond the preset distance ranges, and may randomly select, from the objects corresponding to the distance beyond the preset distance ranges, the to-be-presented objects of the quantity of to-be-presented objects that further need to be selected. For example, the distance corresponding to the preset distance ranges is 0 km to 20 km, the preset total quantity of presented objects is 100, and a total quantity of to-be-presented objects that are selected from objects corresponding to 0 km to 20 km is 80. In this case, 20 to-be-presented objects may be randomly selected from objects corresponding to a distance greater than 20 km.

In addition, after determining the quantity of to-be-presented objects corresponding to each distance range, the server may randomly select the to-be-presented objects within multiple distance ranges in an ascending order of corresponding distances. When a quantity of objects corresponding to a distance range is less than the quantity of to-be-presented objects, the server may select all objects corresponding to the distance range, and accumulate, to a next distance range, a difference between a quantity of to-be-presented objects that should be selected corresponding to the distance range and the quantity of objects corresponding to the distance range. That is, for the first distance range in the multiple preset distance ranges, a to-be-presented object is randomly selected from objects corresponding to the first distance range according to the quantity of to-be-presented objects corresponding to each distance range. For every other distance range other than the first distance range among the multiple preset distance ranges, a to-be-presented account is randomly selected according to a quantity of to-be-presented objects corresponding to the distance range and a difference between a quantity of to-be-presented objects corresponding to a distance range previous to the distance range and a quantity of objects corresponding to the distance range previous to the distance range. For example, the multiple preset distance ranges are respectively [0, 0.1) km, [0.1, 0.8) km, and [0.8, 2) km. The quantities of to-be-presented objects corresponding to the distance ranges are 40, 30, and 30 respectively. The quantities of objects corresponding to the distance ranges are 35, 40, and 50. The first distance range is [0, 0.1) km. The quantity of to-be-presented objects selected within the distance range is 35. A quantity of to-be-presented objects randomly selected within the second distance range [0.1, 0.8) km is 35. A quantity of to-bepresented objects randomly selected within the third distance range [0.8, 2) km is 30.

Optionally, the user may actively block some objects, and the server may not present these objects. Corresponding processing may be as follows: receiving an object blocking request that is sent by the target terminal and that carries an object blacklist, where the object blacklist includes at least one object; and separately randomly selecting the to-be-presented objects from objects corresponding to each distance range other than the at least one object, and returning the to-be-presented objects to be presented on the target terminal.

During implementation, when searching for people nearby, activities nearby, or groups nearby by using the short-distance object search function of the application, the user may set an object blacklist. The object blacklist may record at least one object that the user intends to block. Specifically, the user may open the application, and a button corresponding to a short-distance object blocking function may be set in the application. The user may tap on the button, and the terminal may display the object blacklist, so that the user may enter, in the object blacklist, a name of the object that the user intends to block. The name may be a nickname of an account, a theme of an activity, or a group name of a chat group. After the user completes entering and taps on a confirmation button, the terminal may be triggered to send to the server an object blocking request carrying the object blacklist. The object blacklist may include at least one object.

After receiving the object blocking request sent by the target terminal, the server may obtain the at least one object in the object blacklist. Then, after obtaining the objects corresponding to each distance range, the server may separately randomly select a quantity of to-be-presented objects from objects corresponding to each distance range other than the at least one object, and send the selected to-be-presented objects to the target terminal.

In addition, when the target terminal displays the to-be-presented objects sent by the terminal, a corresponding blocking button may be set near each object. After the user taps on a blocking button, the terminal may automatically add an object corresponding to the blocking button to the object blacklist. In this way, before the terminal sends a short-distance object search request to the server at the next time, an object blocking request carrying the object blacklist may be first sent.

In this embodiment of the present disclosure, a short-distance object search request sent by a target terminal is received, and location information of the target terminal is obtained; objects whose distances from the target terminal fall within each distance range are separately determined according to the location information of the target terminal, location information of prestored objects for short-distance object search, and multiple preset distance ranges, to obtain one or more objects corresponding to each distance range; and a to-be-presented object is separately randomly selected from the objects corresponding to each distance range, and the to-be-presented objects are presented to the target terminal. In this way, there is relatively great randomness when a server presents short-distance objects, lowering duplication of objects that are found for multiple times, and thereby enhancing effectiveness of a short-distance object search function.

In some embodiments, the server may receive a second short-distance object search request sent by the target terminal. In this case, the server obtains location information of the target terminal from the second short-distance object search request. If the distance between the location of the terminal when submitting the previous second short-distance object search request and the current location is greater than a preset threshold, the second short-distance object search request sent by the target terminal will be treated as a new request that has no relationship with the previous request because the terminal has moved to a new location and the user of the terminal is now interested in the nearby events at the new location. Alternatively, if the time difference between the previous short-distance object search request and the second short-distance object search request is greater than a preset value (e.g., an hour or more), the computer server will treat the second short-distance object search request sent by the target terminal as a new request that has no relationship with the previous request because it is assumed that those nearby terminals have been moving around and many new users may just move into the nearby region.

However, if the distance between the location of the terminal when submitting the previous second short-distance object search request and the current location is not greater than the preset threshold and/or the time difference between the previous short-distance object search request and the second short-distance object search request is not greater than the preset value, the computer server will assume that the second request is related to the first request. For example, the user of the terminal may not be interested in the objects returned by the server in response to the previous request. In this case, the server will repeat the operations like operations 102 and 103 to randomly select at least second to-be-presented object from the objects corresponding to each distance range except that the second to-be-presented object is different from the to-be-presented object corresponding to the previous short-distance object search request and return a second set of to-be-presented objects including the at least second to-be-presented object to be presented on the target terminal. In other words, the server tries to find new objects that has not been presented to the terminal before and return their associated information to the requesting terminal to generate more interest from the user of the terminal to reach out to one of the newly recommended objects in the nearby.

In some embodiments, the server may automatically return the second set of to-be-presented objects including the at least second to-be-presented object to be presented on the target terminal even without an explicit second short-distance object search request sent by the target terminal. For example, the computer server may measure the user response at the terminal after returning a set of objects (e.g., user accounts of a social networking application in the nearby) and choose to return a second set different from the previously returned ones until after the user of the terminal terminates the search nearby function or the user selects to reach out one of the recommended objects by tapping the object's icon on the display of the terminal.

Figure 5:
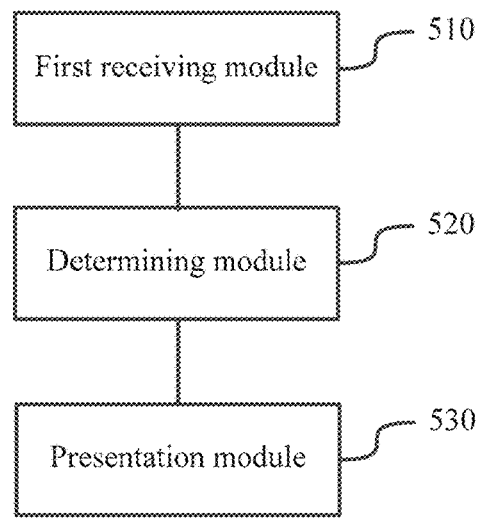
FIG. 5 is a schematic structural diagram of an apparatus for searching for a short-distance object according to some embodiments of the present disclosure.

Based on the same technical concept, this embodiment of the present disclosure further provides an apparatus for searching for a short-distance object. As shown in FIG. 5, the apparatus includes:

a first receiving module 510, configured to: receive a short-distance object search request sent by a target terminal, and obtain location information of the target terminal from the short-distance object search request;

a determining module 520, configured to separately determine, according to the location information of the target terminal, location information of prestored objects for short-distance object search, and multiple preset distance ranges, objects whose distances from the target terminal fall within each distance range, to obtain one or more objects corresponding to each distance range; and a presentation module 530, configured to: separately randomly select a to-be-presented object from the objects corresponding to each distance range, and return the to-be-presented objects to be presented on the target terminal.

Optionally, the objects for short-distance object search are activities; and the determining module 520 is configured to:

separately determine, according to the location information, location information of prestored activities for short-distance object search, and multiple preset distance ranges, in activities for which differences between activity organization times and a current time are less than a preset time length threshold, activities whose distances from the target terminal fall within each distance range, to obtain activities corresponding to each distance range.

Optionally, the object for short-distance object search are user accounts of a social networking application; and the determining module 520 is configured to:

separately determine, according to the location information, location information of terminals to which prestored user accounts for short-distance object search log in, and the multiple preset distance ranges, in user accounts that currently log in and for which differences between times when the user accounts send short-distance object search requests for the last time and a current time are less than a preset time length threshold, user accounts for which distances between terminals to which the user accounts log in and the target terminal fall within each distance range, to obtain one or more user accounts corresponding to each distance range.

Figure 6:
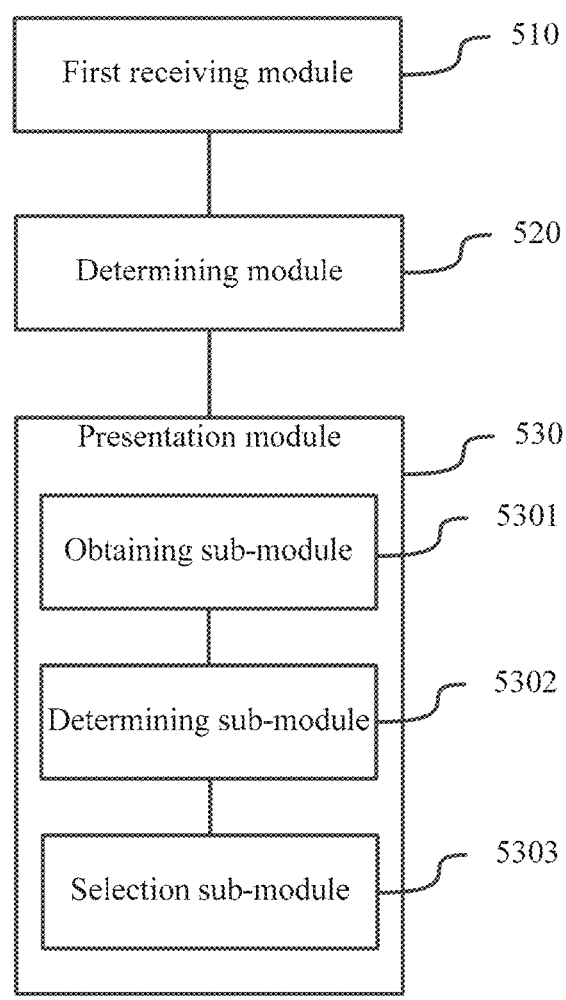
FIG. 6 is a schematic structural diagram of an apparatus for searching for a short-distance object according to some embodiments of the present disclosure.

Optionally, as shown in FIG. 6, the presentation module 530 includes:

an obtaining sub-module 5301, configured to obtain a weight corresponding to each distance range;

a determining sub-module 5302, configured to determine a quantity of to-be-presented objects corresponding to each distance range according to the weight corresponding to the distance range and a preset total quantity of presented objects; and a selection sub-module 5303, configured to separately randomly select the to-be-presented object from the objects corresponding to each distance range according to the quantity of to-be-presented objects corresponding to each distance range.

Figure 7:
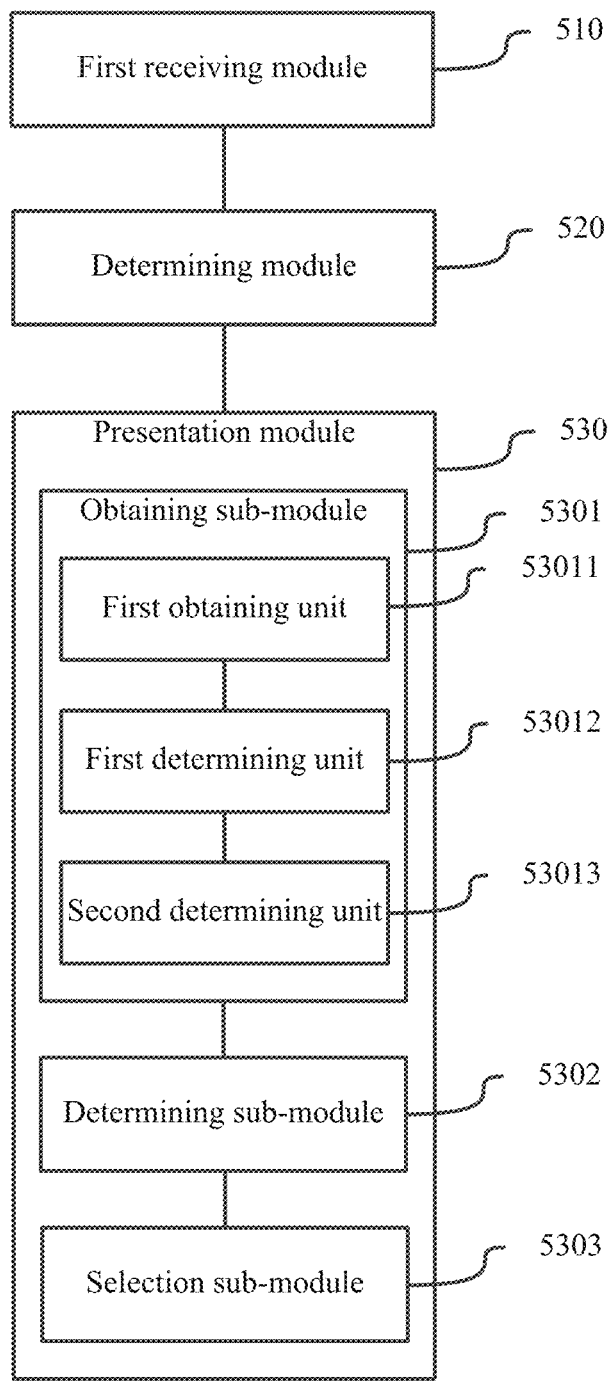
FIG. 7 is a schematic structural diagram of an apparatus for searching for a short-distance object according to some embodiments of the present disclosure.

Optionally, as shown in FIG. 7, the obtaining sub-module 5301 includes:

a first obtaining unit 53011, configured to: for each distance range, obtain a quantity of objects that are found by user accounts in a user account library by using short-distance object search requests within the distance range within a preset historical time length, and a quantity of selected objects among the objects that are found by using the short-distance object search requests within the distance range;

a first determining unit 53012, configured to: for each distance range, determine a ratio of the quantity of objects that are selected within the distance range to the quantity of objects that are found within the distance range; and a second determining unit 53013, configured to determine the weight corresponding to the distance range according to the ratio corresponding to each distance range.

Figure 8:
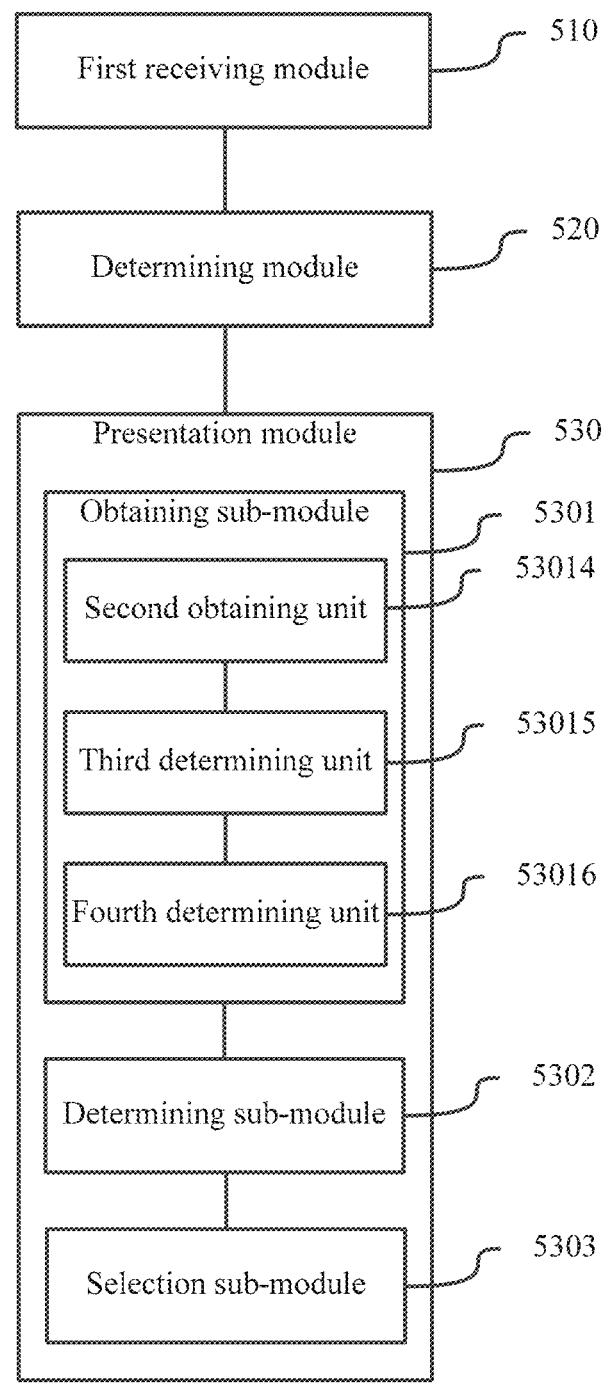
FIG. 8 is a schematic structural diagram of an apparatus for searching for a short-distance object according to some embodiments of the present disclosure.

Optionally, as shown in FIG. 8, the obtaining sub-module 5301 includes:

a second obtaining unit 53014, configured to: for each distance range, obtain a quantity of objects that are found, by using a short-distance object search request, by a target account that logs in to the target terminal within the distance range within a preset historical time length, and a quantity of selected objects among the objects that are found by using the short-distance object search request within the distance range;

a third determining unit 53015, configured to: for each distance range, determine a ratio of the quantity of objects that are selected within the distance range to the quantity of objects that are found within the distance range; and a fourth determining unit 53016, configured to determine the weight corresponding to the distance range according to the ratio corresponding to each distance range.

Optionally, the presentation module 530 is configured to:

separately randomly select a same quantity of to-be-presented objects from the objects corresponding to each distance range based on a preset total quantity of presented objects.

Optionally, the presentation module 530 is configured to:

return the to-be-presented objects to be presented on the target terminal in an ascending order of current distances between terminals of the selected to-be-presented objects and the target terminal.

Figure 9:
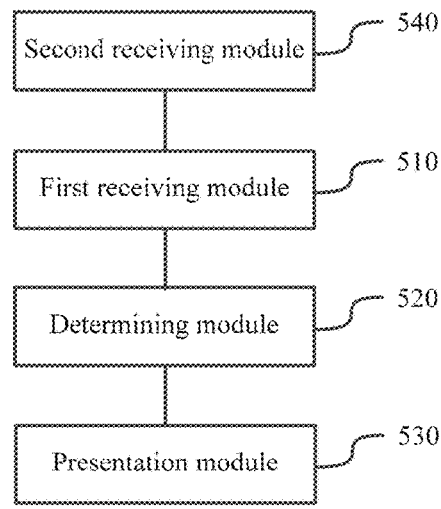
FIG. 9 is a schematic structural diagram of an apparatus for searching for a short-distance object according to some embodiments of the present disclosure.

Optionally, as shown in FIG. 9, the apparatus further includes:

a second receiving module 540, configured to receive an object blocking request that is sent by a target terminal and that carries an object blacklist, where the object blacklist includes at least one object, where the presentation module 530 is configured to:

separately randomly select the to-be-presented object from objects corresponding to each distance range other than the at least one object, and return the to-be-presented objects to be presented on the target terminal.

In this embodiment of the present disclosure, a short-distance object search request sent by a target terminal is received, and location information of the target terminal is obtained; objects whose distances from the target terminal fall within each distance range are separately determined according to the location information of the target terminal, location information of prestored objects for short-distance object search, and multiple preset distance ranges, to obtain one or more objects corresponding to each distance range; and a to-be-presented object is separately randomly selected from the objects corresponding to each distance range, and the to-be-presented objects are presented to the target terminal. In this way, there is relatively great randomness when a server presents short-distance objects, lowering duplication of objects that are found for multiple times, and thereby enhancing effectiveness of a short-distance object search function.

It should be noted that division of the foregoing functional modules is only described for exemplary purposes when the apparatus for searching for a short-distance object provided in the foregoing embodiment searches for a short-distance object. In an actual application, the foregoing functions may be allocated to be accomplished by different functional modules according to requirements, that is, the internal structure of the apparatus is divided into different functional modules, to accomplish all or a part of functions of the above described functions. Besides, the apparatus for searching for a short-distance object provided in the foregoing embodiment and embodiments of the method for searching for a short-distance object belong to a same concept. Refer to the method embodiments for details of a specific implementation process thereof. Details are not described herein.

Figure 10:
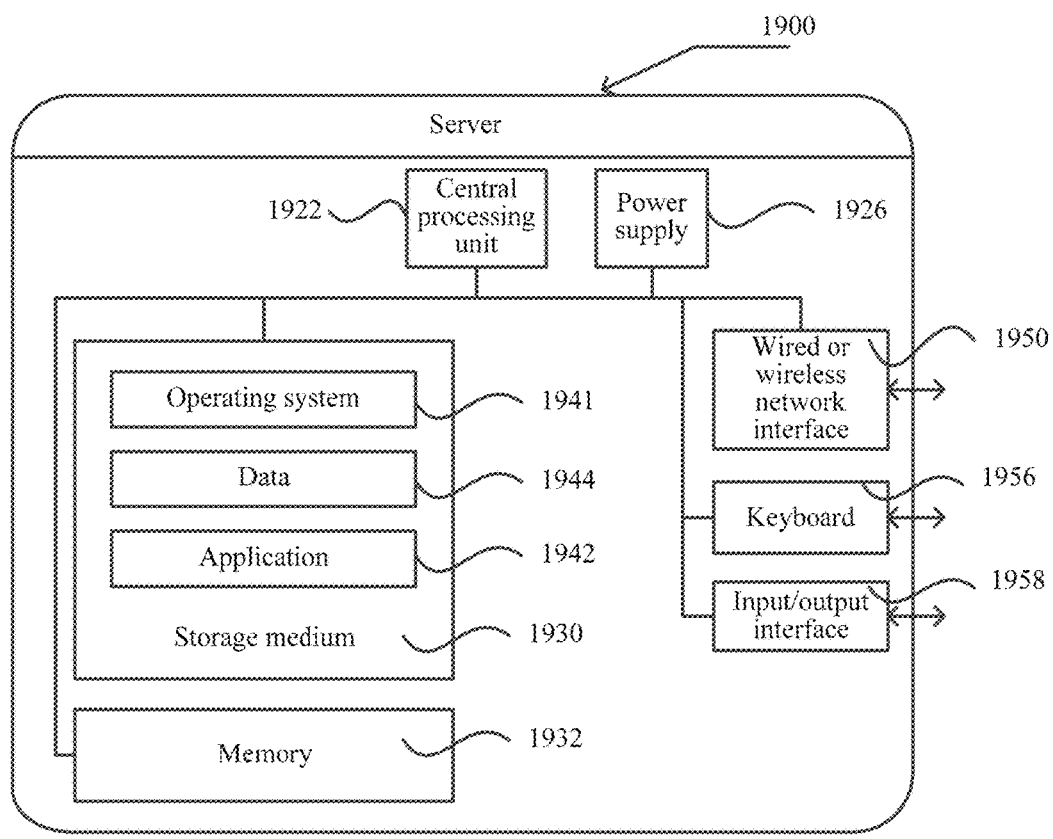
FIG. 10 is a schematic structural diagram of a server according to some embodiments of the present disclosure.

FIG. 10 is a schematic structural diagram of a server according to some embodiments of the present disclosure.

The server 1900 may vary greatly due to different configurations or performance, and may include one or more central processing units (CPU) 1922 (for example, one or more processors) and a memory 1932, and one or more storage media 1930 (for example, one or more mass storage devices) that store applications 1942 or data 1944. The memory 1932 and the storage medium 1930 may be transient or persistent storages. The program stored in the storage medium 1930 may include one or more modules (not shown in the figure), and each module may include a series of instructions and operations for the statistics server. Still further, the CPU 1922 may be configured to communicate with the storage medium 1930, and perform, on the server 1900, a series of instructions and operations in the storage medium 1930.

The server 1900 may further include one or more power supplies 1926, one or more wired or wireless network interfaces 1950, one or more input/output interfaces 1958, one or more keyboards 1956, and/or one or more operating systems 1941, for example, Windows Server™, Mac OS X™, Unix™, Linux™, or FreeBSD™.

The server 1900 may include a memory and one or more programs. The one or more programs are stored in the memory and configured to be executed by one or more processors. The one or more programs contain instructions for performing the method for searching for a short-distance object in the foregoing embodiments.

In an exemplary embodiment, a non-transitory computer readable storage medium including instructions, for example, a memory including instructions, is further provided. The instructions may be executed by a processor of a mobile terminal to perform the method for searching for a short-distance object. For example, the non-transitory computer readable storage medium may be a read-only memory (ROM), a random access memory (RAM), a compact disc read-only memory (CD-ROM), a magnetic tape, a floppy disk, an optical data storage device, and the like.

A person of ordinary skill in the art may understand that all or some of the operations of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for searching for a short-distance object performed at a computer server having one or more processors and memory storing one or more programs to be executed by the one or more processors, the method comprising:

receiving a short-distance object search request sent by a target terminal;

obtaining location information of the target terminal from the short-distance object search request;

determining, for each of multiple preset distance ranges, objects whose distances from the target terminal fall within the corresponding distance range according to the location information of the target terminal and location information of prestored objects for short-distance object search to obtain one or more objects corresponding to the corresponding distance range;

randomly selecting at least one to-be-presented object from the one or more objects corresponding to each distance range; and returning the to-be-presented objects to be presented on the target terminal in an ascending order of current distances between terminals of the selected to-be-presented objects and the target terminal.

2. The method according to claim 1, wherein the objects for short-distance object search are user accounts of a social networking application; and the determining, for each of multiple preset distance ranges, objects whose distances from the target terminal fall within the corresponding distance range according to the location information of the target terminal and location information of prestored objects for short-distance object search to obtain one or more objects corresponding to the corresponding distance range comprises:

determining, for each of the multiple preset distance ranges, according to the location information, location information of terminals to which prestored user accounts for short-distance object search log in, in user accounts that currently log in and for which differences between times when the user accounts send short-distance object search requests for the last time and a current time are less than a preset time length threshold, user accounts for which distances between terminals to which the user accounts log in and the target terminal fall within the corresponding distance range, to obtain one or more user accounts corresponding to the corresponding distance range.

3. The method according to claim 1, wherein the randomly selecting at least one to-be-presented object from the one or more objects corresponding to each distance range comprises:

obtaining a weight corresponding to each distance range;

determining a quantity of to-be-presented objects corresponding to each distance range according to the weight corresponding to the distance range and a preset total quantity of presented objects; and randomly selecting the at least one to-be-presented object from the objects corresponding to each distance range according to the quantity of to-be-presented objects corresponding to the distance range.

4. The method according to claim 3, wherein the obtaining a weight corresponding to each preset distance range comprises:

for each distance range, obtaining a quantity of objects that are found by user accounts in a user account library by using short-distance object search requests within the distance range within a preset historical time length, and a quantity of selected objects among the objects that are found by using the short-distance object search requests within the distance range;

for each distance range, determining a ratio of the quantity of objects that are selected within the distance range to the quantity of objects that are found within the distance range; and determining the weight corresponding to the distance range according to the ratio corresponding to each distance range.

5. The method according to claim 3, wherein the obtaining a weight corresponding to each distance range comprises:

for each distance range, obtaining a quantity of objects that are found, by using a short-distance object search request, by a target account that logs in to the target terminal within the distance range within a preset historical time length, and a quantity of selected objects among the objects that are found by using the short-distance object search request within the distance range;

for each distance range, determining a ratio of the quantity of objects that are selected within the distance range to the quantity of objects that are found within the distance range; and determining the weight corresponding to the distance range according to the ratio corresponding to each distance range.

6. The method according to claim 1, wherein the randomly selecting at least one to-be-presented object from the one or more objects corresponding to each distance range comprises:

randomly selecting a same quantity of to-be-presented objects from the objects corresponding to each distance range based on a preset total quantity of presented objects.

7. The method according to claim 1, wherein before the receiving a short-distance object search request sent by a target terminal, the method further comprises:

receiving an object blocking request that is sent by the target terminal and that carries an object blacklist, wherein the object blacklist comprises at least one object, wherein the randomly selecting at least one to-be-presented object from the one or more objects corresponding to each distance range, and returning the to-be-presented objects to be presented on the target terminal comprises:

randomly selecting the at least one to-be-presented object from the one or more objects corresponding to each distance range other than the at least one object; and returning the to-be-presented objects to be presented on the target terminal.

8. The method according to claim 1, further comprising:

after returning the to-be-presented objects to be presented on the target terminal:

receiving a second short-distance object search request sent by the target terminal;

obtaining location information of the target terminal from the second short-distance object search request;

determining, according to the location information of the target terminal, location information of prestored objects for short-distance object search, and multiple preset distance ranges, objects whose distances from the target terminal fall within each distance range, to obtain one or more objects corresponding to each distance range;

randomly selecting at least second to-be-presented object from the one or more objects corresponding to each distance range, the at least second to-be-presented object different from the at least one to-be-presented object corresponding to the previous short-distance object search request; and returning a second set of to-be-presented objects including the at least second to-be-presented object to be presented on the target terminal.

9. The method according to claim 8, wherein a time difference between the short-distance object search request and the second short-distance object search request is less than a predefined threshold.

10. A server, comprising:
one or more processors;
memory; and
one or more programs stored in the memory, the one or more programs being configured to be executed by the one or more processors and cause the server to perform a plurality of operations including:

receiving a short-distance object search request sent by a target terminal;

obtaining location information of the target terminal from the short-distance object search request;

determining, for each of multiple preset distance ranges, objects whose distances from the target terminal fall within the corresponding distance range according to the location information of the target terminal and location information of prestored objects for short-distance object search to obtain one or more objects corresponding to the corresponding distance range;

randomly selecting at least one to-be-presented object from the one or more objects corresponding to each distance range; and returning the to-be-presented objects to be presented on the target terminal in an ascending order of current distances between terminals of the selected to-be-presented objects and the target terminal.

11. The server according to claim 10, wherein the randomly selecting at least one to-be-presented object from the one or more objects corresponding to each distance range comprises:

obtaining a weight corresponding to each distance range;

determining a quantity of to-be-presented objects corresponding to each distance range according to the weight corresponding to the distance range and a preset total quantity of presented objects; and randomly selecting the at least one to-be-presented object from the objects corresponding to each distance range according to the quantity of to-be-presented objects corresponding to the distance range.

12. The server according to claim 11, wherein the obtaining a weight corresponding to each preset distance range comprises:

for each distance range, obtaining a quantity of objects that are found by user accounts in a user account library by using short-distance object search requests within the distance range within a preset historical time length, and a quantity of selected objects among the objects that are found by using the short-distance object search requests within the distance range;

for each distance range, determining a ratio of the quantity of objects that are selected within the distance range to the quantity of objects that are found within the distance range; and determining the weight corresponding to the distance range according to the ratio corresponding to each distance range.

13. The server according to claim 11, wherein the obtaining a weight corresponding to each distance range comprises:

for each distance range, obtaining a quantity of objects that are found, by using a short-distance object search request, by a target account that logs in to the target terminal within the distance range within a preset historical time length, and a quantity of selected objects among the objects that are found by using the short-distance object search request within the distance range;

for each distance range, determining a ratio of the quantity of objects that are selected within the distance range to the quantity of objects that are found within the distance range; and determining the weight corresponding to the distance range according to the ratio corresponding to each distance range.

14. The server according to claim 10, wherein the plurality of operations further comprise:

before receiving a short-distance object search request sent by a target terminal:

receiving an object blocking request that is sent by the target terminal and that carries an object blacklist, wherein the object blacklist comprises at least one object, wherein randomly selecting the at least one to-be-presented object from the one or more objects corresponding to each distance range other than the at least one object; and returning the to-be-presented objects to be presented on the target terminal.

15. The server according to claim 10, wherein the plurality of operations further comprise:

after returning the to-be-presented objects to be presented on the target terminal:

receiving a second short-distance object search request sent by the target terminal;

obtaining location information of the target terminal from the second short-distance object search request;

determining, for each of the multiple preset distance ranges, objects whose distances from the target terminal fall within the corresponding distance range according to the location information of the target terminal and location information of prestored objects for short-distance object search to obtain one or more objects corresponding to the corresponding distance range;

randomly selecting at least second to-be-presented object from the one or more objects corresponding to each distance range, the at least second to-be-presented object different from the at least one to-be-presented object corresponding to the previous short-distance object search request; and returning a second set of to-be-presented objects including the at least second to-be-presented object to be presented on the target terminal.

16. A non-transitory computer readable storage medium, storing a plurality of computer executable instructions, the computer executable instructions being executed by one or more processors of a computer server that is communicatively connected to a plurality of terminal devices to perform a plurality of operations including:

receiving a short-distance object search request sent by a target terminal;

obtaining location information of the target terminal from the short-distance object search request;

determining, for each of multiple preset distance ranges, objects whose distances from the target terminal fall within the corresponding distance range according to the location information of the target terminal and location information of prestored objects for short-distance object search to obtain one or more objects corresponding to the corresponding distance range;

randomly selecting at least one to-be-presented object from the one or more objects corresponding to each distance range; and returning the to-be-presented objects to be presented on the target terminal in an ascending order of current distances between terminals of the selected to-be-presented objects and the target terminal.

17. The non-transitory computer readable storage medium according to claim 16, wherein the randomly selecting at least one to-be-presented object from the one or more objects corresponding to each distance range comprises:

obtaining a weight corresponding to each distance range;

determining a quantity of to-be-presented objects corresponding to each distance range according to the weight corresponding to the distance range and a preset total quantity of presented objects; and randomly selecting the at least one to-be-presented object from the objects corresponding to each distance range according to the quantity of to-be-presented objects corresponding to the distance range.

18. The non-transitory computer readable storage medium according to claim 16, wherein the plurality of operations further comprise:

before receiving a short-distance object search request sent by a target terminal:

receiving an object blocking request that is sent by the target terminal and that carries an object blacklist, wherein the object blacklist comprises at least one object, wherein randomly selecting the at least one to-be-presented object from the one or more objects corresponding to each distance range other than the at least one object; and returning the to-be-presented objects to be presented on the target terminal.

\* \* \* \* \*